United States Patent
Yoon et al.

(10) Patent No.: US 8,493,530 B2
(45) Date of Patent: Jul. 23, 2013

(54) PANEL FOR CONTROLLING VIEWING ANGLE AND LIQUID CRYSTAL DISPLAY HAVING THE SAME

(75) Inventors: Won-Gap Yoon, Seoul (KR); Nam-Seok Lee, Suwon-Si (KR); Jeong-Uk Heo, Seongnam-Si (KR)

(73) Assignee: Samsung Display Co., Ltd. (KR)

( * ) Notice: Subject to any disclaimer, the term of this patent is extended or adjusted under 35 U.S.C. 154(b) by 558 days.

(21) Appl. No.: 12/113,824

(22) Filed: May 1, 2008

(65) Prior Publication Data
US 2008/0273148 A1 Nov. 6, 2008

(30) Foreign Application Priority Data
May 3, 2007 (KR) .................. 10-2007-0043006

(51) Int. Cl.
*G02F 1/1333* (2006.01)
*G02F 1/1347* (2006.01)

(52) U.S. Cl.
USPC ............... 349/110; 349/74; 349/75; 349/111

(58) Field of Classification Search
USPC ............... 349/75, 106, 110, 74, 117, 81, 111
See application file for complete search history.

(56) References Cited

U.S. PATENT DOCUMENTS

| | | | |
|---|---|---|---|
| 5,307,188 A * | 4/1994 | Dingwall et al. | 349/81 |
| 6,504,590 B1 * | 1/2003 | Kikuchi et al. | 349/113 |
| 6,646,697 B1 * | 11/2003 | Sekiguchi et al. | 349/73 |
| 6,762,808 B2 * | 7/2004 | Bayrle et al. | 349/106 |
| 7,697,105 B2 * | 4/2010 | Koyama et al. | 349/153 |
| 7,760,292 B2 * | 7/2010 | Jin et al. | 349/75 |

FOREIGN PATENT DOCUMENTS

WO WO 2007007552 A1 * 1/2007
WO WO 2007039958 A1 * 4/2007

* cited by examiner

*Primary Examiner* — Edward Glick
*Assistant Examiner* — David Chung
(74) *Attorney, Agent, or Firm* — Innovation Counsel LLP

(57) ABSTRACT

The invention relates to a panel for controlling viewing angle and a liquid crystal display having the same. More particularly, there is provided a panel for controlling viewing angle including a first substrate; a second substrate facing the first substrate; liquid crystal layer provided between the first and the second substrate; a first electrode disposed on the first substrate; a second electrode disposed on a first side of the second substrate facing the first electrode; and a light blocking film disposed on a second side of the second electrode and a liquid crystal display having the same.

13 Claims, 6 Drawing Sheets

PANEL FOR CONTROLLING VIEWING ANGLE AND LIQUID CRYSTAL DISPLAY HAVING THE SAME

CROSS REFERENCE TO RELATED APPLICATION

This application claims priority to Korean Patent Application No. 10-2007-0043006 filed on May 3, 2007 and all the benefits accruing therefrom under 35 U.S.C. §119, the contents of which are incorporated by reference in their entirety.

BACKGROUND OF THE INVENTION

1. Field of the Invention

The invention relates to a liquid crystal display panel having a controllable viewing angle.

2. Description of the Related Art

Although a narrow viewing angle has been one of the main drawbacks of liquid crystal displays (LCDs), various technologies such as compensation films, polarizers, and domain dividing techniques makes it possible for LCDs to have a wide viewing angle. By employing the wide viewing angle technologies, LCDs can be used in various applications, including computer monitors and televisions. Although wide viewing angle technologies are generally advantageous for LCD devices, there are cases in which a wide viewing angle is not desirable. While a wide viewing angle is generally desired for LCDs in conventional viewing situations, in applications where privacy protection is important, such as automatic teller machines (ATMs), civil affairs departments handling personal records, government agencies and so forth, a narrow viewing angle would be desirable to prevent others from viewing the displayed image.

Privacy filters may be attached to a conventional LCD panel to create a narrow viewing angle for the display. The privacy filter operates by stacking a light blocking partition wall in a film to block light transmission at angles beyond a predetermined angle, thereby displaying a black image.

In the privacy filter, however, mode change between the wide and the narrow viewing angle mode is not possible. Therefore, it is not possible to selectively choose a wide or narrow viewing angle depending on the desired usage.

SUMMARY OF THE INVENTION

A panel for controlling a viewing angle which can enable switching between a wide viewing angle mode and a narrow viewing angle mode, and liquid crystal display having the same are described.

According to an exemplary embodiment of the invention, a panel for controlling a viewing angle includes: a first substrate; a second substrate facing the first substrate; a liquid crystal layer interposed between the first and the second substrates; a first electrode formed on the first substrate; a second electrode formed on a first side of the second substrate to face the first electrode; and a light blocking film formed on a second side of the second substrate.

The light blocking film is formed of a light blocking material.

The light blocking film is arranged to correspond to the shape and position of the first electrode.

The first electrode is formed as a plurality of lines spaced apart from each other.

The panel for controlling a viewing angle further includes a light transmitting film provided on the second side of the second substrate, and the light blocking film is formed on the light transmitting film.

According to another exemplary embodiment of the invention, a liquid crystal display includes a liquid crystal display panel for displaying images, and a panel for controlling viewing angle arranged on the liquid crystal display panel. The panel for controlling a viewing angle includes: a first substrate; a second substrate facing the first substrate; a liquid crystal layer interposed between the first and the second substrates; a first electrode formed on the first substrate; and a second electrode formed on a first side of the second substrate to face the first electrode.

The first electrode is formed as a plurality of lines spaced apart from each other.

Regions of the panel for controlling a viewing angle corresponding to the first electrode are displayed as a plurality of black lines, when power is applied to the panel for controlling viewing angle.

Regions of the liquid crystal display panel corresponding to the plurality of black lines are displayed black.

The first electrode is formed extending in a columnar direction. The liquid crystal display panel includes a thin film transistor substrate and a color filter substrate facing the thin film transistor substrate, the color filter substrate having a plurality of color filters arranged in a matrix form so that an identical column includes different colors.

According to another exemplary embodiment of the invention, the liquid crystal display further includes a light blocking film formed on the second side of the second substrate.

The light blocking film is formed of a light blocking material.

The light blocking film is arranged to correspond to the shape and position of the first electrode.

The first electrode is formed as a plurality of lines spaced apart from each other.

Regions of the panel for controlling a viewing angle corresponding to the first electrode are displayed as a plurality of black lines when power is applied to the panel for controlling a viewing angle.

The liquid crystal display further includes a light transmitting film arranged on the second side of the second substrate, and the light blocking film is formed on the light transmitting film.

BRIEF DESCRIPTION OF THE DRAWINGS

Exemplary embodiments of the present invention can be understood in more detail from the following description taken in conjunction with the accompanying drawings, in which.

DETAILED DESCRIPTION OF THE EXEMPLARY EMBODIMENT

Hereinafter, exemplary embodiments of the invention will be described in detail with reference to the accompanying drawings.

Figure 1:
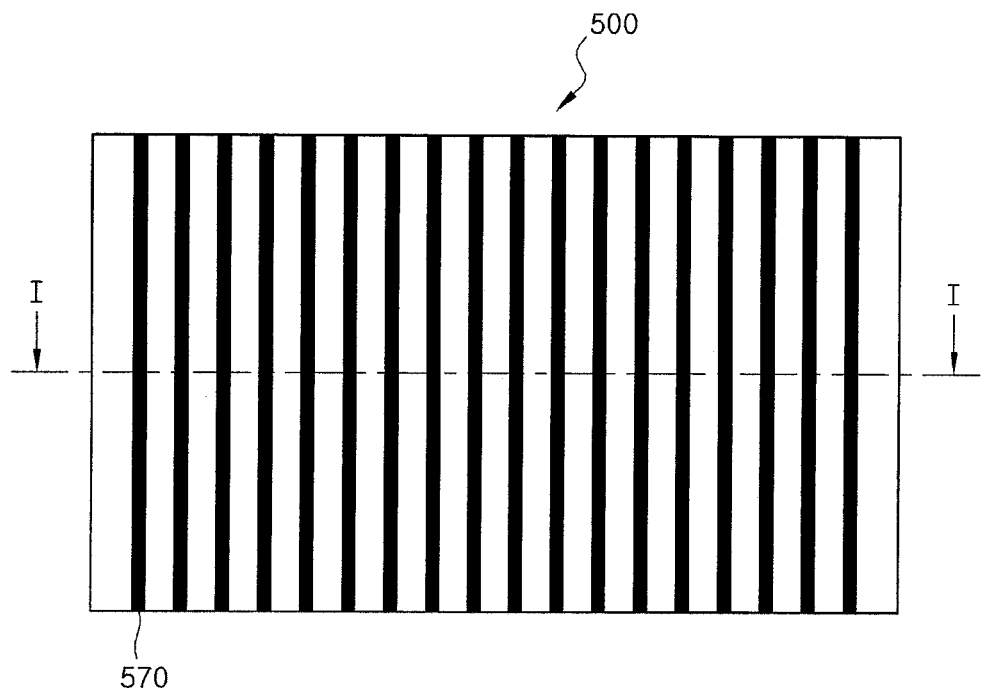
FIG. 1 is a plan view of a panel for controlling viewing angle in accordance with a first embodiment of the present invention.
Figure 2:
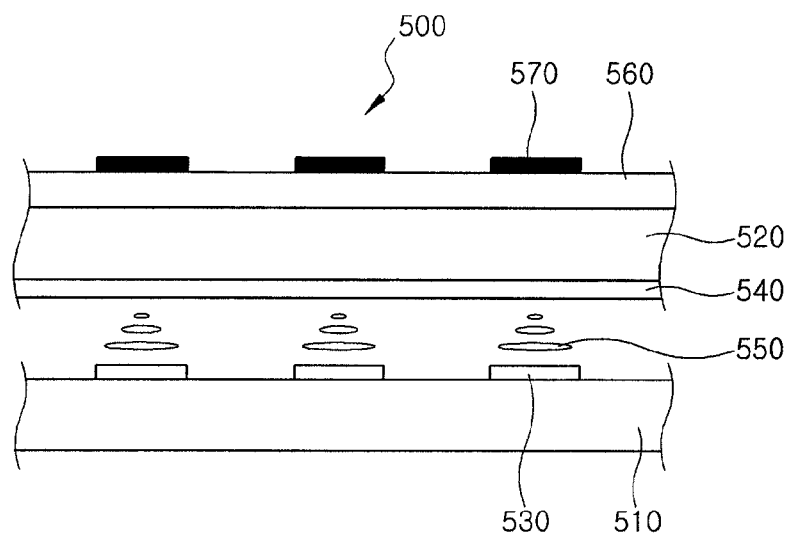
FIG. 2 is a cross-sectional view of the panel taken along line I-I of FIG. 1.

FIG. 1 is a plan view of a panel for controlling a viewing angle in accordance with a first embodiment of the present invention, and FIG. 2 is a cross-sectional view of the panel taken along line I-I of FIG. 1.

Referring to FIGS. 1 and 2, the panel for controlling a viewing angle 500 includes a first substrate 510, a second substrate 520, a first electrode 530, a second electrode 540, a liquid crystal layer 550, a light transmitting film 560, and a light blocking film 570.

For the first substrate 510, a transparent insulating substrate such as a glass substrate is used. The first electrode 530 is formed on the first substrate 510. The first electrode 530 is formed as a plurality of lines spaced apart from each other and arranged in parallel. Although FIG. 1 illustrates a first electrode 530 formed to extend in a columnar direction, i.e. the shorter side direction, the extending direction of the first electrode 530 is not limited thereto and, e.g., may extend along the longer dimension of the panel. The first electrode 530 is made of transparent conductive material such as Indium Tin Oxide (ITO), Indium Zinc Oxide (IZO) and the like.

For the second substrate 520, a transparent insulating substrate such as a glass substrate is used. The second substrate 520 is arranged to face the first substrate 510, and the liquid crystal layer 550 is interposed between the first substrate 510 and the second substrate 520. The liquid crystal layer 550 is a normally-white-type layer in this embodiment, which displays white when power is not supplied thereto and displays black when power is supplied thereto.

The second electrode 540 is formed on a first side of the second substrate 520, that is, a side facing the first electrode of the first substrate. The second electrode 540 is formed on the second substrate 520 in a rectangular shape or a square shape corresponding to the shape of the second substrate 520. The second electrode 540 is made of a transparent conductive material such as ITO or IZO, similar to the first electrode 530. The light transmitting film 560 is provided on a second side of the second substrate 520. The light blocking film 570 is formed on the light transmitting film 560.

The light blocking film 570 is formed to correspond to the shape and position of the first electrode 530 formed on the first substrate 510. The light blocking film 570 is formed as a plurality of lines similar to the first electrode 530. The lines are formed spaced apart from each other. Although the light blocking film 570 is herein formed to extend in a columnar direction, i.e., the shorter side direction, the extending direction of the light blocking film 570 is not limited thereto and, e.g., may extend along the longer dimension of the panel. The light blocking film 570 is made of a light blocking material. Regions where the light blocking film 570 is formed are displayed black since the light blocking film 570 blocks light emitted from an LCD panel (not shown).

When the panel 500 is operated in a wide viewing angle mode, power is not supplied to the first electrode 530 on the first substrate 510 and to the second electrode 540 on the second substrate 520. The liquid crystal layer 550 transmits the light emitted from the LCD panel (not shown). Most of the light emitted from the LCD panel is therefore transmitted while only a small amount of the light emitted is blocked by the light blocking film 570. Although the light blocking film 570 blocks a part of the light emitted from the LCD panel, an initial viewing angle of the LCD panel can be maintained. That is, even though the panel for controlling a viewing angle 500 is attached to the LCD panel, the LCD panel initially having a wide viewing angle can be used still in the wide viewing angle mode by not supplying power to the panel for controlling a viewing angle 500.

The operation of the panel 500 in a narrow viewing angle mode is described below by referring to FIGS. 3 and 4.

Figure 3:
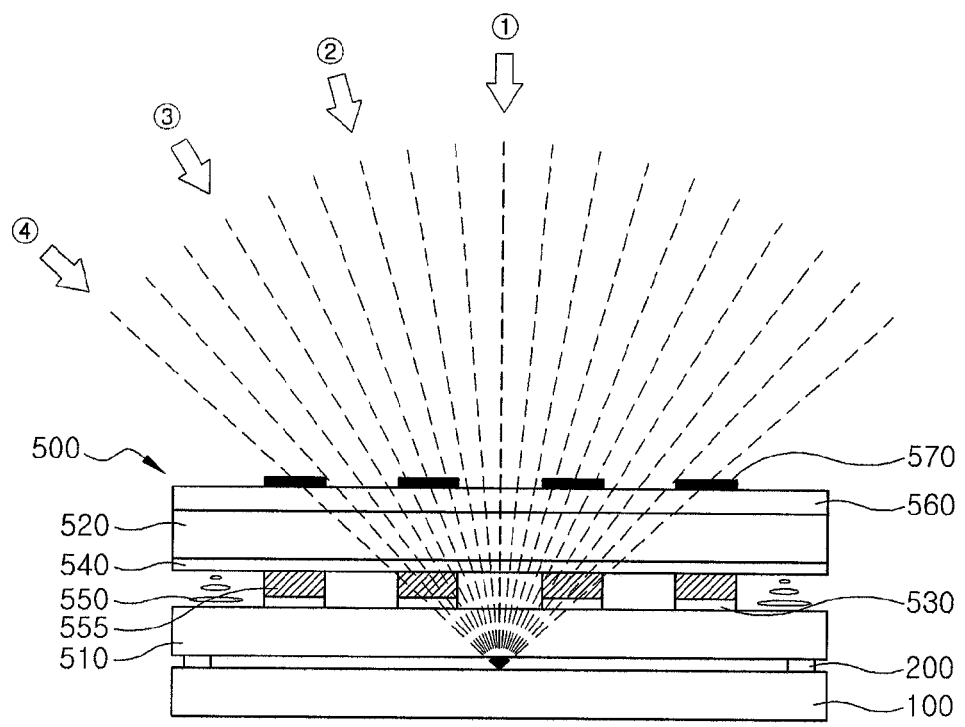
FIG. 3 is a schematic cross-sectional view of an LCD having the panel in accordance with the first embodiment of the present invention.

FIG. 3 is a schematic cross-sectional view of an LCD having the panel for controlling a viewing angle in accordance with the first embodiment of the present invention. FIG. 4 is a schematic diagram illustrating the change in a visible region according to viewing positions when the LCD of FIG. 3 is driven in the narrow viewing angle mode.

Figure 4:
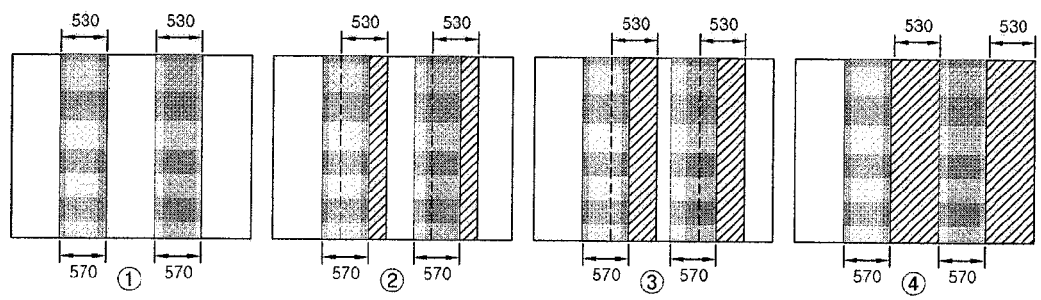
FIG. 4 illustrates the change in a visible region according to viewing positions when the LCD of FIG. 3 is driven in a narrow viewing angle mode.

Referring to FIGS. 3 and 4, the panel for controlling a viewing angle 500 is arranged on an LCD panel 100. A backlight unit (not shown) is disposed under the LCD panel 100 and supplies light to the LCD panel 100. The panel for controlling viewing angle 500 may be attached to the LCD panel 100 using a bonding material 200. Although a double-stick tape is used in this embodiment, the bonding material 200 is not limited thereto and other types of materials for bonding two surfaces together may be used.

When power is supplied to the panel for controlling a viewing angle 500 in order to operate the panel 500 in the narrow viewing angle mode, the power is supplied to the first electrode 530 on the first substrate 510 and the second electrode 540 on the second substrate 520. As a result, the liquid crystal layer 550 blocks the light emitted from the LCD panel 100. Therefore, regions corresponding to the first electrode 530 are displayed as a plurality of black lines 555. The panel for controlling a viewing angle 500 blocks the light emitted from the LCD panel 100 with two groups of black lines. The first group is a plurality of black lines (hereinafter, referred to as "first lower black lines") generated by the liquid crystal layer 550 interposed between the first substrate 510 and the second substrate 520. The second group is a plurality of black lines (hereinafter, referred to as "first upper black lines") generated by the light blocking film 570 formed on the light transmitting film 560.

The first lower black lines that are generated when power is applied to the panel for controlling a viewing angle 500 and the first upper black lines are arranged to face each other with an identical configuration. The first lower black lines and the first upper black lines are spaced apart from each other by a distance corresponding to the thickness of the light transmitting film 560 and the thickness of the second substrate 520. When the LCD panel 100 is viewed from a direction orthogonal to the upper surface of the panel 500 (show as position ① in FIG. 3), the first upper black lines and the first lower black lines appear to be completely overlapping. As a result, the light emitted from the LCD panel 100 is blocked by portions corresponding to the widths of the black lines 555, while the remaining light which passes between the light blocking film 570 is viewable by the viewer. This is shown in panel ① of FIG. 4.

As the viewing angle moves from a direction orthogonal to the surface of the panel 500 to a direction at an angle to the surface of the panel (increasing viewing angles are shown in FIG. 3 as ①→②→③), the gaps between the first upper black lines and the first lower black lines are gradually reduced. As a result, the regions where the light can be emitted from the LCD panel are also reduced. When viewed from a large viewing angle ④, the first upper black lines are largely positioned in the gaps between the first lower black lines. Accordingly, most of the regions where light is emitted from the LCD panel 100 are covered by either the first upper black lines or the first lower black lines. Thereby, most of the light emitted from the LCD panel is not visible from the viewing angle ④, as shown in FIG. 4.

A critical angle at which none of the light emitted from the LCD panel is visible can be adjusted in any of the wide and the narrow viewing angle modes of the panel for controlling a viewing angle 500. The critical angle can be controlled depending on various parameters such as linewidths of the first upper black lines and the first lower black lines, a spacing between the first upper black lines and the first lower black lines, and a spacing between the respective black lines. That is, the critical angle can be controlled by adjusting linewidths of the light blocking film 570 and the first electrode 530, thicknesses of the second substrate 520 and the light transmitting film 560, or a spacing between the respective light blocking films 570 or the first electrodes 530.

Figure 5:
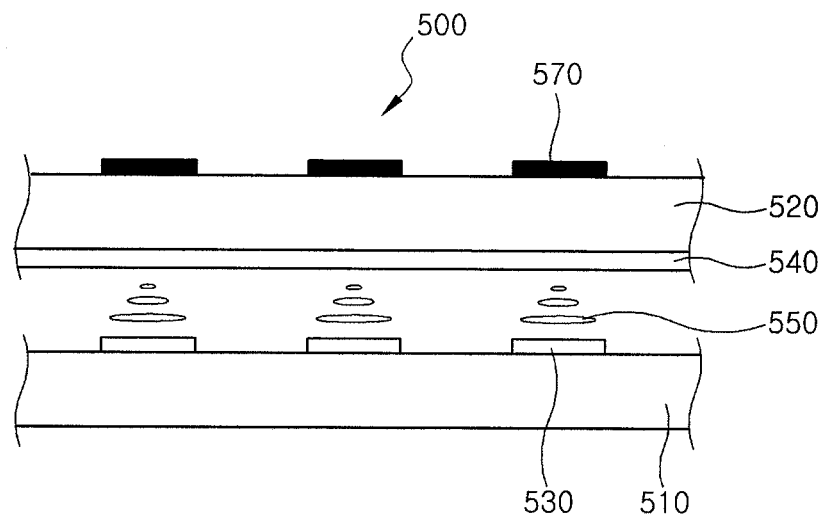
FIG. 5 is a cross-sectional view of a panel for controlling a viewing angle in accordance with a second embodiment of the present invention.

FIG. 5 is a cross-sectional view of a panel for controlling a viewing angle in accordance with a second embodiment of the present invention. In the panel for controlling viewing angle illustrated in FIG. 5, the light blocking film is placed in a different position while other configurations are similar to the panel in accordance with the first embodiment described above. Therefore, the following description will focus on the differences.

Referring to FIG. 5, the panel for controlling a viewing angle 500 includes a first substrate 510, a second substrate 520, a first electrode 530, a second electrode 540, a liquid crystal layer 550 and a light blocking film 570.

The first electrode 530 is formed on the first substrate 510. The first electrode 530 is formed as a plurality of lines. The plurality of lines are formed to be spaced apart from each other. The second substrate 520 is arranged to face the first substrate 510, and the liquid crystal layer 550 is interposed between the first substrate 510 and the second substrate 520. The second electrode 540 is formed on the first side of the second substrate 520, that is, the side facing the first electrode of the first substrate. The light blocking film 570 is formed on a second side of the second substrate 520. The light blocking film 570 is formed in a corresponding shape and position to the first electrode 530 formed on the first substrate 510. The light blocking film 570 is formed as a plurality of lines similarly to the first electrode 530, and the lines are formed to be spaced apart from each other.

Figure 6:
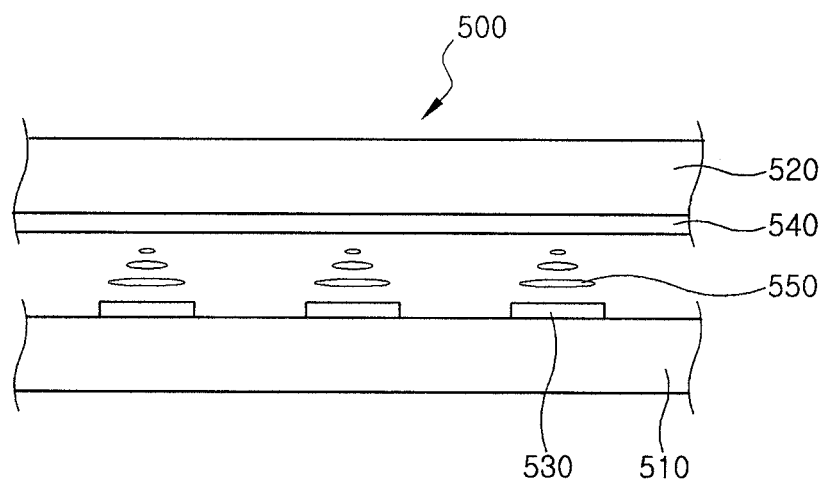
FIG. 6 is a cross-sectional view of a panel for controlling a viewing angle in accordance with a third embodiment of the present invention.
Figure 7A:
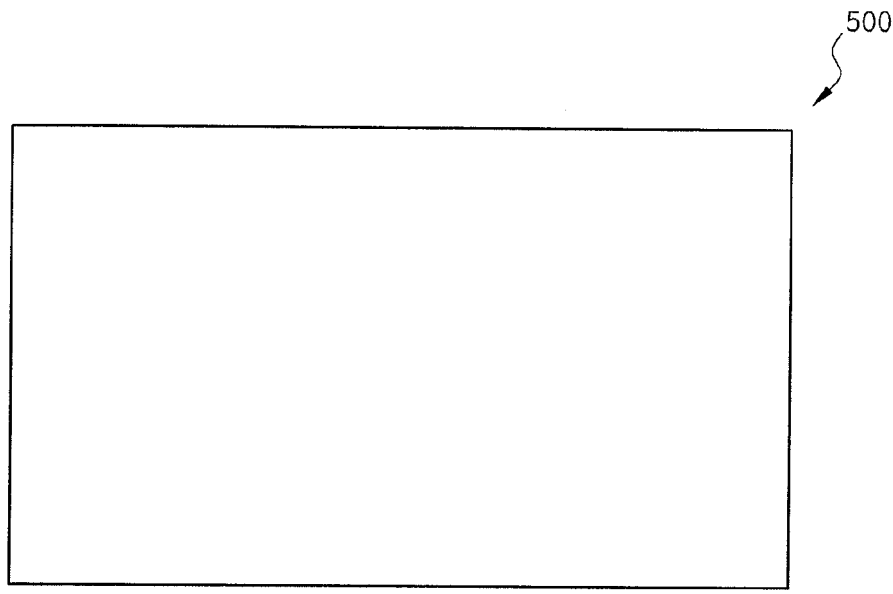
FIGS. 7A and 7B are a plan view and a cross-sectional view, respectively, of an LCD having the panel in accordance with the third embodiment of the present invention when the LCD is driven in a wide viewing angle mode.
Figure 7B:
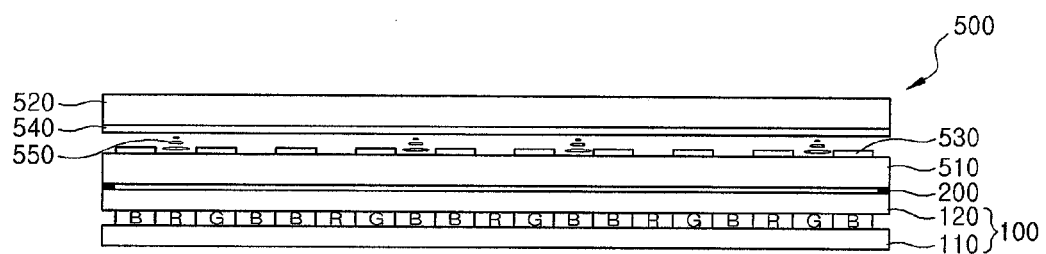
Figure 8A:
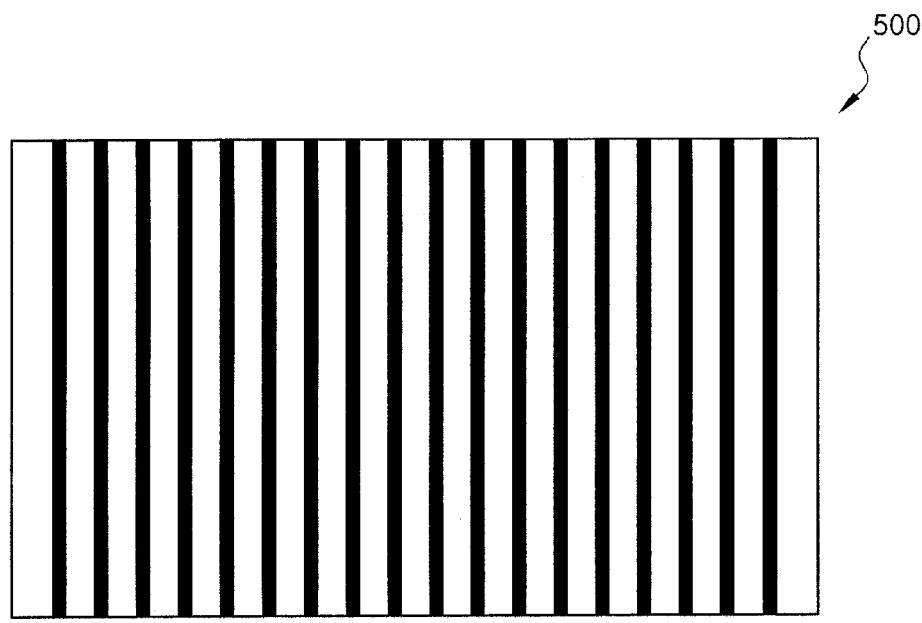
FIG. 8A and 8B are a plan view and a cross-sectional view, respectively, of an LCD having the panel in accordance with the third embodiment of the present invention when the LCD is driven in the narrow viewing angle mode.
Figure 8B:
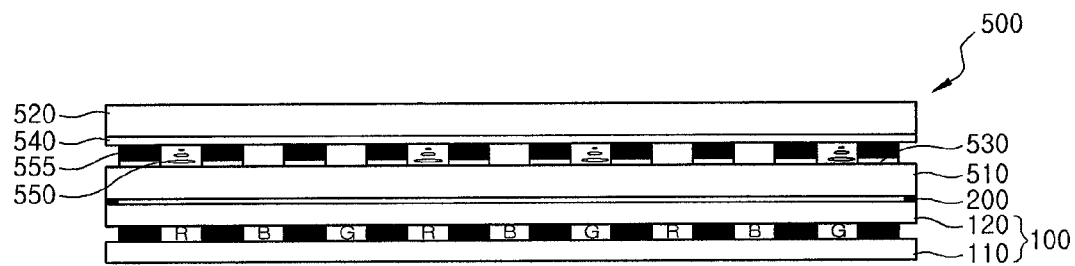
Figure 9:
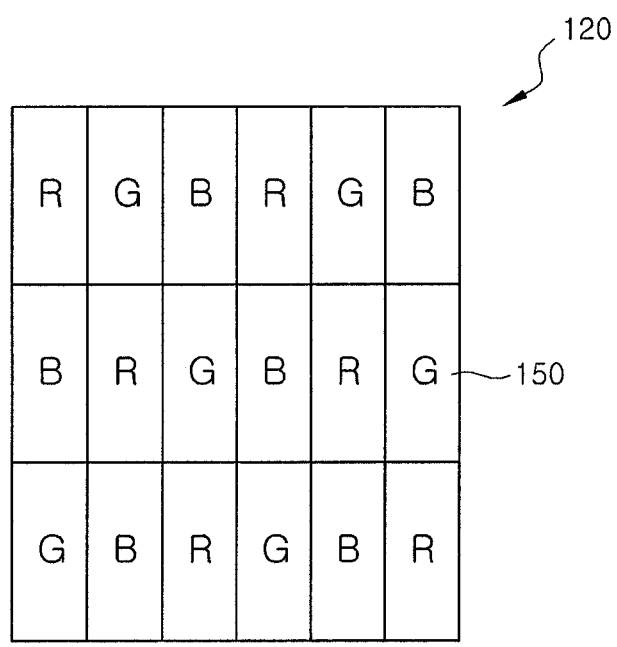
FIG. 9 is a plan view of a color filter substrate of the LCD having the panel in accordance with the third embodiment of the present invention.

FIG. 6 is a cross-sectional view of a panel for controlling a viewing angle in accordance with a third embodiment of the present invention. FIG. 7A and 7B are a plan view and a cross-sectional view, respectively, of an LCD having the panel in accordance with the third embodiment of the present invention, when the LCD is driven in the wide viewing angle mode. FIG. 8A and 8B are a plan view and a cross-sectional view, respectively, of the LCD having the panel in accordance with the third embodiment of the present invention, when the LCD is driven in the narrow viewing angle mode. FIG. 9 is a plan view of a color filter substrate of the LCD having the panel in accordance with the third embodiment of the present invention.

Referring to FIG. 6, the panel for controlling a viewing angle 500 includes a first substrate 510, a second substrate 520, a first electrode 530, a second electrode 540 and a liquid crystal layer 550.

For the first substrate 510, a transparent insulating substrate such as a glass substrate is used. The first electrode 530 is formed on the first substrate 510. The first electrode 530 is formed as a plurality of lines, and the lines are formed to be spaced apart from each other and arranged in parallel. Although FIG. 6 illustrates a first electrode 530 formed to extend in a columnar direction, i.e., the shorter side direction, the extending direction of the first electrode 530 is not limited thereto and, e.g., may extend along the longer dimension of the panel. The first electrode 530 is made of transparent conductive material such as ITO, IZO and the like.

For the second substrate 520, a transparent insulating substrate such as a glass substrate is used. The second substrate 520 is arranged to face the first substrate 510, and the liquid crystal layer 550 is interposed between the first substrate 510 and the second substrate 520. The liquid crystal layer 550 is a default-white-type layer in this embodiment, which displays white when power is not supplied thereto and displays black when power is supplied thereto. The second electrode 540 is formed on the first side of the second substrate 520, that is, the side facing the first electrode of the first substrate. The second electrode 540 is formed on the second substrate 520 in a rectangular or a square shape corresponding to the shape of the second substrate 520. The second electrode 540 is made of transparent conductive material such as ITO or IZO, similar to the first electrode 530.

Referring to FIGS. 7A and 7B, the panel for controlling a viewing angle 500 is arranged on an LCD panel 100 under which a backlight unit (not shown) is disposed. The panel for controlling a viewing angle 500 is attached to the LCD panel 100 using a bonding material 200. Although a double-stick tape is used in this embodiment, the bonding material 200 is not limited thereto. The LCD panel 100 includes a thin film transistor substrate 110, a color filter substrate 120, and a liquid crystal layer (not shown) interposed between the thin film transistor substrate 110 and the color filter substrate 120.

When power is not supplied to the panel for controlling viewing angle 500, the panel for controlling a viewing angle 500 is driven in the wide viewing angle mode. Here, the power is not supplied to the first electrode 530 on the first substrate 510 and to the second electrode 540 on the second substrate 520, and the liquid crystal layer 550 transmits light emitted from the LCD panel 100. As a result, when the panel for controlling a viewing angle 500 is driven in the wide viewing angle mode, an initial viewing angle of the LCD panel 100 can be maintained even with the panel for controlling a viewing angle 500 disposed on the LCD panel.

Referring to FIGS. 8A and 8B, when power is supplied to the panel for controlling a viewing angle 500 in order to drive the panel for controlling a viewing angle 500 in the narrow viewing angle mode, power is supplied to the first electrode 530 on the first substrate 510 and the second electrode 540 on the second substrate 520, and the liquid crystal layer 550 blocks light emitted from the LCD panel 100. Therefore, regions corresponding to the first electrode 530 are displayed as a plurality of black lines 555. That is, when power is supplied to the panel for controlling a viewing angle 500, a plurality of black lines (hereinafter referred to as "second upper black lines") generated by the liquid crystal layer 550 interposed between the first substrate 510 and the second substrate 520 are displayed.

The LCD panel 100 provided under the panel for controlling a viewing angle 500 includes a color filter substrate, a thin film transistor substrate arranged to face the color filter substrate, and a liquid crystal layer interposed between the thin film transistor substrate and the color filter substrate. On the thin film transistor substrate, a thin film transistor, a pixel electrode and a storage capacitor electrode are provided. The thin film transistor switches on or off a signal voltage to the liquid crystal as a switching element. The storage capacitor electrode forms a storage capacitor to maintain the signal voltage supplied to the pixel electrode for a predetermined time. The color filter substrate includes a plurality of color filters on which a common electrode is formed.

In the LCD panel 100, pixel regions corresponding to the upper black lines are displayed black, in which the upper black lines are displayed on the panel for controlling a viewing angle 500. As such, a plurality of black lines(hereinafter, referred to as "second lower black lines") is displayed in the LCD panel 100.

In the panel for controlling a viewing angle 500, the light emitted from the LCD panel 100 is blocked by the second upper black lines and the second lower black lines, respectively. The second upper black lines are generated by the liquid crystal layer 550 interposed between the first substrate 510 and the second substrate 520. The second lower black lines are generated by the LCD panel 100. As the viewing position moves from the direct front to the side of the LCD, the gaps between the second upper black lines and the second lower black lines are gradually reduced. Accordingly, regions where the light can be emitted from the LCD panel are also reduced and thus the viewing angle of the LCD panel becomes narrow.

FIG. 9 shows the arrangement of a plurality of color filters 150 in the color filter substrate 120.

The second upper black lines are disposed in a columnar direction, in which the second upper black lines are generated by the liquid crystal layer 550 interposed between the first substrate 510 and the second substrate 520 of the panel for controlling a viewing angle 500.

Since the second lower black lines, i.e., the plurality of black lines generated by the LCD panel 100, are also disposed in a columnar direction similarly to the second upper black lines, colors are expressed with the pixels that are not occupied by the second lower black lines. The plurality of color filters 150 is arranged in a matrix form on the color filter substrate 120 of the LCD panel 100 so that an identical column includes color filters with different colors. For example, as shown in FIG. 9, a first column is arranged in the order of red-blue-green. A second column and a third column have green-red-blue and blue-green-red arrangements, respectively. The arrangement of the first to the third columns is repeated in the rest of the columns. The order of the colors of the color filters is not limited thereto and may be changed.

When driving the panel for controlling a viewing angle in accordance with the present embodiment in the wide viewing angle mode, loss of the light emitted from the LCD panel is quite insignificant. Therefore, compared to the panel for controlling a viewing angle including the light blocking film according to the aforementioned embodiment, the mode change between the wide and the narrow viewing angle modes can be performed with minimum light loss.

As described above, there is provided a panel for controlling a viewing angle to generate or eliminate black lines for blocking light by controlling power to the panel, which can enable users to easily change between the wide and the narrow viewing angle mode as needed.

Although the panel for controlling a viewing angle and the LCD having the same in accordance with the present invention have been described with reference to the exemplary embodiments, the present invention is not limited thereto. Therefore, it will be readily understood by those skilled in the art that various modifications and changes can be made thereto without departing from the spirit and scope of the present invention defined by the appended claims.

What is claimed is:

1. A panel for controlling viewing angle, comprising:
   a first substrate;
   a second substrate facing the first substrate;
   a liquid crystal layer interposed between the first and the second substrates;
   a first electrode formed on the first substrate as a first plurality of lines spaced apart from each other;
   a second electrode formed on a first side of the second substrate, said second electrode being aligned with the first electrode;
   a light transmitting film provided on the second side of the second substrate; and
   a light blocking film affixed to a second side of the second substrate as a second plurality of lines spaced apart from each other,
   wherein the light blocking film is formed on the light transmitting film, and
   wherein the first electrode overlaps the light blocking film so that centers of ones of the second plurality of lines lie directly over centers of corresponding ones of the first plurality of lines.

2. The panel of claim 1, wherein the light blocking film is formed of light blocking material.

3. The panel of claim 1, wherein the light blocking film is arranged to correspond to the shape and position of the first electrode.

4. A liquid crystal display, comprising:
   a liquid crystal display panel for displaying images; and
   a panel for controlling a viewing angle that is arranged on the liquid crystal display panel, the panel including a first substrate, a second substrate facing the first substrate, a liquid crystal layer interposed between the first and the second substrates, a first electrode formed on the first substrate, and a second electrode formed on a first side of the second substrate to face the first electrode.
   wherein a region of the panel for controlling a viewing angle corresponding to the first electrode is displayed as a plurality of first black lines when power is supplied to the panel for controlling a viewing angle; and
   wherein the liquid crystal display panel displays second black lines positioned to correspond to the first black lines.

5. The liquid crystal display of claim 4, wherein the first electrode is formed as a plurality of lines spaced apart from each other.

6. The liquid crystal display of claim 4, wherein:
   the first electrode is formed extending in a columnar direction; and
   the liquid crystal display panel includes a thin film transistor substrate and a color filter substrate facing the thin film transistor substrate, the color filter substrate having a plurality of color filters arranged in a matrix form so that an identical column has color filters with different colors.

7. The liquid crystal display of claim 4, further comprising a light blocking film formed on a second side of the second substrate.

8. The liquid crystal display of claim 7, wherein the light blocking film is formed of light blocking material.

9. The liquid crystal display of claim 7, wherein the light blocking film is arranged to correspond to the shape and position of the first electrode.

10. The liquid crystal display of claim 9, wherein the first electrode is formed as a plurality of lines spaced apart from each other.

11. The liquid crystal display of claim 10, wherein a region of the panel for controlling a viewing angle corresponding to the first electrode is displayed as a plurality of black lines when power is supplied to the panel for controlling a viewing angle.

12. The liquid crystal display of claim 7, further comprising a light transmitting film arranged on the second side of the second substrate,
  wherein the light blocking film is formed on the light transmitting film.

13. A liquid crystal display, comprising:
a first panel; and
a second panel facing the first panel,
  wherein the first panel displays a first plurality of black lines by blocking light with a liquid crystal layer when power is supplied to the first panel;
  wherein the second panel displays a second plurality of black lines when the first plurality of black lines are displayed; and
  wherein the first plurality of black lines overlaps the second plurality of black lines so that centers of ones of the second plurality of black lines lie directly over centers of corresponding ones of the first plurality of black lines when power is supplied to the first panel.

* * * * *